Patented July 26, 1938

2,125,228

UNITED STATES PATENT OFFICE 2,125,228

BRAZING ALLOY

Oscar E. Harder, Columbus, Ohio, assignor to Battelle Memorial Institute, Columbus, Ohio, a corporation of Ohio No Drawing. Application April 3, 1937, Serial No. 134,898

1 Claim. (Cl. 75—153)

My invention relates to brazing alloys. It has to do particularly with the provision of a copper base alloy for brazing which is to be used for joining such metals as brass, copper, steel and cast iron in various combinations, though it is not necessarily limited thereto.

In the prior art, it is old to use copper-zinc alloys for brazing purposes. Two grades of such alloys have been recognized by the American Society for Testing Materials in their Specification B—64—28. These alloys are designated as 50—50 grade and 52—48 grade. In the former, the copper ranges from 50 to 52 per cent. In the latter, the copper ranges from 52 to 55 per cent. In both cases, the remainder is principally zinc.

The copper-zinc base alloys have relatively high melting points and therefore require relatively high temperatures for application thereof. These high temperatures are harmful to some types of material which are to be soldered or brazed.

It is also old in the prior art to use silver solders and compositions of eight silver solders have been recognized by the American Society for Testing Materials in their Specification B—73—29. The amount of silver contained in these alloys varies from 10 to 80 per cent. This high silver content makes such brazing alloys undesirably expensive. While these silver solders can be used at relatively low temperatures, such as about 1,325° F., this advantage is offset to a considerable extent by the fact that they are expensive and by the fact that the alloys which have the lower melting point are higher in silver content and, therefore, more expensive.

Certain commercial alloys have been developed having desirable characteristics but they do not meet all of the objectives of the present method. For example, a commercial alloy containing approximately 15 per cent silver, 80 per cent copper and 5 per cent phosphorus has been developed. This alloy is claimed to melt at 1,184° F. and to flow at 1,292° F. However, the relatively high percentage of silver makes this alloy quite expensive. There has also been patented an alloy of 10 to 25 per cent silver, 67 to 88 per cent copper and 2 to 8 per cent of phosphorus but it will be obvious that this alloy is subject to the same objection as the commercial alloy discussed immediately above.

Still another alloy has been patented which embodies from 48 to 52 per cent silver, 12 to 16 per cent copper, 14 to 18 per cent zinc and 16 to 20 per cent cadmium. It will be obvious that this alloy, having such a high silver content, must of necessity be unduly expensive.

Many other alloys for use in brazing have been described in technical and patent literature but so far as I am aware the alloy composition which I have developed is new in the art and has many desirable characteristics. My alloy is the result of extensive laboratory experimentation in which many alloy combinations have been studied in order to develop an alloy which fulfills the desired objectives.

One of the objects of this invention is to produce a copper-base alloy which can be used at a much lower temperature than that required for copper brazing and at a lower temperature than can be used for brazing with copper-zinc alloys.

Another object of this invention is to produce a brazing alloy which has desirable characteristics with reference to a low brazing temperature and good physical properties, but which is less expensive than the commercial alloys now available which can be used at such low brazing temperatures as about 1,300° to 1,400° F.

Other objects of this invention will be evident from the discussion which follows.

In the preferred range of the alloy composition which I have found useful for brazing, the copper ranges from 68 to 84 per cent cent, cadmium from 3 to 24 per cent, phosphorus from 2 to 4 per cent, tin up to 10 per cent, nickel up to 2 per cent and silver up to 3.9 per cent. Copper is used as the principal metal both because of its relatively low cost and its desirable properties. Cadmium is used, in part, as a means of lowering the melting temperature of the alloy. It also improves some of the physical properties of the alloy and, further, modifies the color of such alloy.

Since cadmium and tin are both effective in lowering the melting temperature of the alloy, it has been found desirable to use a relatively low range of cadmium content when the tin is used in larger amounts and, likewise, when tin is used in small amounts or is absent from the alloy, the cadmium is preferably increased. Thus, in carrying out my invention, I may replace the cadmium in part by tin which at the present time is cheaper and has in most respects an equivalent function in my brazing alloy.

Phosphorus serves also to lower the melting temperature of the alloy and it further serves as a fluxing medium. Thus, the phosphorus content, for best results, should be varied somewhat depending upon the cadmium and tin content or on the cadmium plus the tin content of the alloy.

Nickel serves to strengthen the alloy. While a good alloy has been prepared without the presence of nickel, a higher strength alloy results from the incorporation of the nickel in some compositions. Since nickel tends to raise the melting temperature of the alloy and is somewhat difficult to add in melting, I prefer to keep the nickel content of my alloy at a relatively low percentage. Therefore, in my preferred alloy, I limit the nickel content to about 2 per cent or less. Within the range up to 2 per cent of nickel, I find that nickel functions in much the same way as silver, particularly with reference to increasing the strength of the alloys and I consider it within the scope of this invention to replace silver in part by nickel.

Silver seems to improve the properties of my alloy by toughening and strengthening it and also makes the alloy flow more readily in brazing. While good results have been obtained with my alloy when it did not embody silver, for certain purposes, I prefer to add silver. However, the amount of silver must be kept to a relatively low percentage, so that the alloy will not be too expensive. Therefore, I preferably limit the amount of silver to less than 4 per cent.

My brazing alloy is preferably produced by melting together the ingredients thereof. Preferably, this melting operation is performed under a flux, which may be constituted of equal parts by weight of sodium chloride and zinc chloride. Such a flux prevents contamination of the alloy by oxides and also prevents loss of the metal in melting.

The phosphorus may conveniently be added as a copper-phosphorus alloy as, for example, such an alloy containing about 15 per cent of phosphorus. The cadmium is conveniently added in the form of a copper-cadmium alloy as, for example, one containing equal amounts of these two metals.

While the use of these alloys in melting is a convenience, such use is not necessary to the production of a satisfactory final alloy. Likewise, the above-mentioned flux is not always essential to the preparation of the alloy, particularly when the melting operation is performed in a reducing atmosphere, as in the presence of hydrogen.

My alloy is preferably used in the form of powder. The alloy to be powdered may be melted as described above, cast into suitable bars or ingots and then reduced to particles of suitable size by a machining operation. The alloy may also be prepared in finely divided form by pouring the molten alloy into water and then crushing or grinding to suitable size. The size of the grains of the powder is of some importance. Thus, I have found that the alloys give good performance in brazing if the powder utilized will pass through a 50-mesh screen but will be retained upon a 100-mesh screen. However, it will be understood that powders of other grain sizes may be utilized without departing from the scope of my invention.

While the best results have been obtained by preparing and using the alloy as described above, some good results have been attained by using a mixture of powders combined in such proportions that the composition of the mixture is that of the desired final alloy. For example, the phosphorus can be added as a copper-phosphorus alloy containing about 15 per cent phosphorus, which is easily powdered. The cadmium can also be added as a brittle alloy with copper, which alloy can be powdered. Copper, silver and tin are available commercially in finely divided forms. Combinations of these powders have been used with results closely approaching those obtained with the alloys prepared by melting together the constituent metals.

One illustration of the advantage of forming the alloy by the use of mixed powders is presented in the preparation of a copper-phosphorus alloy of the eutectic composition, which contains about 8 per cent phosphorus. This alloy does not lend itself to rolling or drawing and is usually prepared as a casting. It can be prepared, however, by making a suitable mixture of powders.

By whatever method my alloy is prepared, it is preferable to conduct the brazing operation in a reducing atmosphere, such as hydrogen. As a preferred method of using my alloy for brazing, I place the powdered alloy on the joints to be brazed, place the parts in a furnace which is electrically heated and protect the work by a reducing atmosphere, such as hydrogen. I have also used certain fluxes to advantage, such as commercial fluxes for brazing, silver nitrate, stannous chloride, and could use other fluxes. Such fluxes are not essential when a reducing atmosphere is used during the brazing operation but they may be helpful in using my alloy for brazing when a satisfactory reducing atmosphere is not available.

The following examples are given as illustrative of particular compositions of my brazing alloy which have been found to have desirable properties:

*Example 1*

| Element | Range | Typical analysis |
|---|---|---|
|  | Percent | Percent |
| Copper | 70-75 | 73.0 |
| Cadmium | 20-25 | 22.5 |
| Phosphorus | 4.0-3.0 | 3.6 |
| Nickel | Up to 1.0 | 0.9 |

The alloy given in Example 1 was found to be completely melted at 1,255° F. and to give a well brazed joint at 1,345° F. When used to braze pieces of brass in a butt joint the specimen showed a tensile strength of 26,800 lbs./sq. in. The toughness of the joint was indicated by the observation that a specimen 2¾" in length by ⅜" by ⅛" with the brazed joint in the middle could be twisted 360 degrees without fracturing.

*Example 2*

| Element | Range | Typical analysis |
|---|---|---|
|  | Percent | Percent |
| Copper | 80-84 | 82.0 |
| Cadmium | 12-17 | 14.3 |
| Phosphorus | 3-2 | 2.7 |
| Nickel | Up to 1.0 | 1.0 |

The composition of Example 2 was quite similar to that of Example 1 in performance except the alloy of Example 2 had a higher melting temperature and required a higher temperature, about 1,400° F., for brazing.

*Example 3*

| Element | Range | Typical analysis |
|---|---|---|
|  | Percent | Percent |
| Copper | 70-75 | 74.2 |
| Cadmium | 12-14 | 14.8 |
| Phosphorus | 4-3 | 3.6 |
| Tin | 2-5 | 3.7 |
| Silver | Less than 4.0 | 3.7 |

The alloy of Example 3 gave good soldered joints at 1,310° F. and was more fluid and flowed better than those of Example 1 or 2, but it is more expensive because of the silver content. The addition of silver, as in the composition of Example 3, seems to improve the impact resistance of the brazed joint.

*Example 4*

| Element | Range | Typical analysis |
|---|---|---|
| | Percent | Percent |
| Copper | 70-80 | 75.2 |
| Cadmium | 7-15 | 9.7 |
| Phosphorus | 3-6 | 4.0 |
| Tin | 6-10 | 7.4 |
| Nickel | Up to 4.0 | 3.7 |

The alloy of Example 4 required a higher temperature for brazing than those of Examples 1 and 3 and gave inferior results in brazing brass but worked quite well with copper. For most purposes for which my alloy is intended it is considered that a nickel content of 3.7% is higher than the most desirable range.

*Example 5*

| Element | Range | Typical analysis |
|---|---|---|
| | Percent | Percent |
| Copper | 72-78 | 76.6 |
| Cadmium | 3-6 | 4.0 |
| Phosphorus | .4-3 | 3.5 |
| Tin | 10-16 | 15.9 |

The alloy of Example 5 was used to braze copper to copper at 1,290° F., the brazed joint was stronger than the copper metal which failed at 25,000 lbs./sq. in. This alloy could be used at a temperature of 1,255° F. but a better joint was obtained when a slightly higher temperature was used.

The stability and corrosion resistance of my brazing alloy was studied by preparing brazed specimens, exposing them by alternate immersion in tap water and drying in air. These specimens were run with other brazed with prior art commercial silver brazing alloys. These tests included specimens of brass to brass and copper to copper. In some tests, the Example 1 was used both with and without the addition of 5 per cent of silver. In Example 4, no silver was added. The tests were conducted for a period of over two months. Tensile tests of the specimens which had been thus exposed showed that there had been practically no loss in strength and that the strength of joints made with my alloy compared favorably with prior art commercial silver alloys which are much more expensive. Moreover, these tests also showed that my alloys such as shown in Examples 1 and 4 were substantially as good as when they were supplemented by the addition of as much as 5 per cent of silver.

By my researches, a new brazing alloy has been developed. The composition of the alloy may be varied somewhat to meet special requirements. The range in composition which I consider most useful has been stated and examples of some of the compositions which have been studied extensively have been given.

Having thus described my invention, what I claim is:

An alloy for brazing consisting of from 68 to 84 per cent copper, from 3 to 24 per cent cadmium, from 2 to 4 per cent phosphorus and up to 3.9 per cent silver.

OSCAR E. HARDER.